March 6, 1928.
A. EKMAN
1,661,605
ADDING MACHINE
Filed March 18, 1926    6 Sheets-Sheet 1
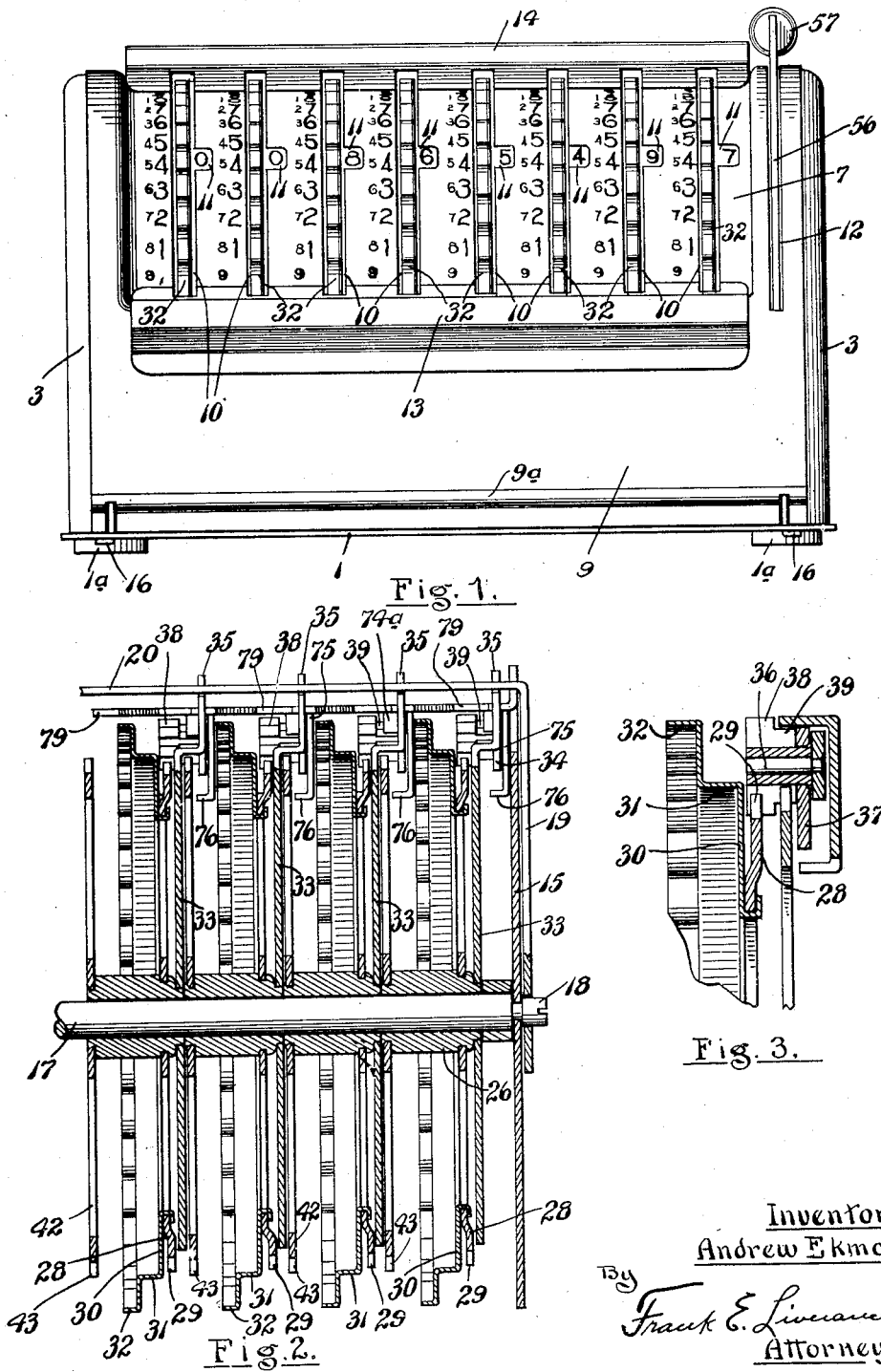
Inventor
Andrew Ekman
By Frank E. Liverance Jr.
Attorney.

March 6, 1928.   1,661,605

A. EKMAN

ADDING MACHINE

Filed March 18, 1926   6 Sheets-Sheet 2

Inventor
Andrew Ekman
By Frank E. Liverance
Attorney

March 6, 1928.  A. EKMAN  1,661,605

ADDING MACHINE

Filed March 18, 1926   6 Sheets-Sheet 4

Inventor
Andrew Ekman
By
Frank E. Liviana Jr.
Inventor

March 6, 1928.  
A. EKMAN  
ADDING MACHINE  
Filed March 18, 1926   6 Sheets-Sheet 5

1,661,605

Inventor  
Andrew Ekman  
By Frank E. Liverance, Jr.  
Attorney.

March 6, 1928.

A. EKMAN 1,661,605

ADDING MACHINE

Filed March 18, 1926　　6 Sheets-Sheet 6

Inventor
Andrew Ekman
By Frank E. Liverance, Jr.
Attorney.

Patented Mar. 6, 1928.

1,661,605

UNITED STATES PATENT OFFICE.

ANDREW EKMAN, OF GRAND RAPIDS, MICHIGAN.

ADDING MACHINE.

Application filed March 18, 1926. Serial No. 95,668.

This invention relates to adding machines for addition and subtraction computations. It is an object and purpose of the invention to make a machine of the character stated having a minimum number of parts, of which a great number are duplicates, so that the cost of manufacture is reduced to a minimum and the machine can be manufactured and marketed at a low price. Another object of the invention is to so construct the machine that the operation of subtraction is accomplished by a mere reversal of the operation of addition, that is, where manual movement of certain members is made in one direction for purposes of addition, manual movement of the same members in the opposite direction accomplishes subtraction, the subtraction operation being very simple and involving no indirection as is required in many adding machines for accomplishing subtraction operations. A further object of the invention is to provide the machine with means whereby it is substantially proof against over running in either direction, that is, for either addition or subtraction operations, said means being of a simple yet effective character. Many other objects and purposes including simplifications in structure for the accomplishment of carrying as well as in clearing the machine, will be apparent as understanding of the invention is had from the following description, taken in connection with the accompanying drawings, in which Fig. 1 is a front elevation of the adding machine made in accordance with my invention.

Fig. 2 is a fragmentary longitudinal section on a horizontal plane from the front side of the machine to the central axis thereof, and on an upwardly and rearwardly inclined plane from said central axis to the rear of the machine.

Fig. 3 is a fragmentary enlarged horizontal section taken through the carrying and overthrow prevention means disposed between adjacent computing units.

Like reference characters refer to like parts in the different figures of the drawings.

Figure 4:
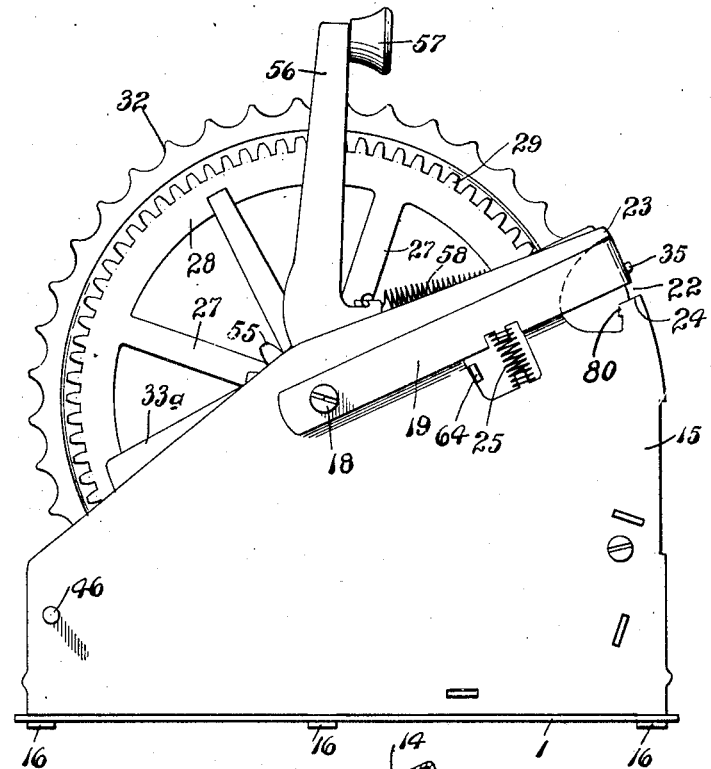
Fig. 4 is an end elevation of the adding machine construction, the enclosing cover being removed.

The mechanism of the said machine is located above and carried on a base plate 1 which, in practice may be equipped with suitable feet 1ª at its under side for resting on a desk or other article of furniture. The mechanism is housed by a casing which passes thereover. It includes two ends 2 with integrally turned flanges 3 over which the main portion of the casing is placed. Said main portion of the casing has a back 4 connected integrally with a forward and upwardly curved portion 5 which reaches to substantially the central portion of the machine where it is pressed inwardly, as indicated at 6, and then continued forwardly and inwardly in the arc of a circle, as indicated at 7, thence being bent outwardly at 8, terminating in a downwardly extending vertical front side 9. The inwardly located or depressed front curved portion 7 of the casing is formed with a plurality of spaced apart vertical slots 10 through which the operating members of the computing units project, as will hereafter appear. At the right of each slot 10 and connected therewith is a small opening 11 through which openings the totals for any computation may be seen. The casing adjacent one end is also provided with a vertical slot 12 for the passage of the clearing lever. At the lower end of the portion 7 of the casing a finger stop bar 13 is located lying horizontally the full width of the inwardly pressed part 7 of said casing. In similar manner a second stop bar 14 is located horizontally at the upper end of said portion 7 of the casing and extends the full width thereof. All parts of the casing and the stop bars 13 and 14 are of metal being readily formed into shape by suitable dies.

The mechanism is supported by two spaced apart end plates 15, one being located vertically near each end 2 of the casing. These plates are connected to the base plate 1 having tongues 16 at their lower edges which pass through the base plate and are clenched thereagainst. A horizontal shaft 17 is located between the supporting end plates 15 and is attached and held in place by screws 18, as shown in Fig. 2 which also serve as supports for arms 19 of a U-shaped bail which is completed by a cross bar 20, the cross bar 20 and arms 19 being integral. The U-shape bail described is of flat metal and extends upwardly and to the rear from the pins 18 on which it is loosely mounted. The bar 20 has a plurality of spaced apart openings 21 cut therethrough and it lies in a somewhat wider recess 22 formed at the rear upper portions of the end plates 15, being limited in movement between the upper lip 23 above said recess in each plate and the lower shoulder 24 at the lower edges of said recesses. The arms 19 are acted upon by light springs 25, as shown in Fig. 4, which normally hold the upper edge of the cross bar 20 against the upper lips 23. Said springs are readily yieldable so as to permit movement of the bail in a downward direction.

A number of computing units are mounted side by side on the shaft or rod 17, each includes a hub 26 freely rotatable on the shaft. At one end of each of said hubs a wheel is fixed having spokes 27 and a rim 28, the outer edge of which is provided with a consecutive series of gear teeth 29, eighty in number. A sheet metal member is attached to each of said rims 28, as shown in Fig. 3, including a section 30 which substantially parallels the plane of its associated rim 28, being thence turned at right angles as indicated at 31 to make an annular flange on which figures in vertical sequence are printed or otherwise attached. These figures read in succession from 0 to 9 and are then repeated, four series of Arabic numerals being placed on the flange which may be termed, the dial for each computing unit. After the flange or dial portion 31 is formed the metal is continued outwardly and formed into a consecutive series of projections 32 with finger receiving depressions between them, forty of said depressions around the dial member being made. The computing units are so located and positioned on the rod 17 that the finger engaging projections extend through the slots 10 of the casing in a position to be engaged and actuated by the fingers of an operator of the machine.

Figure 5:
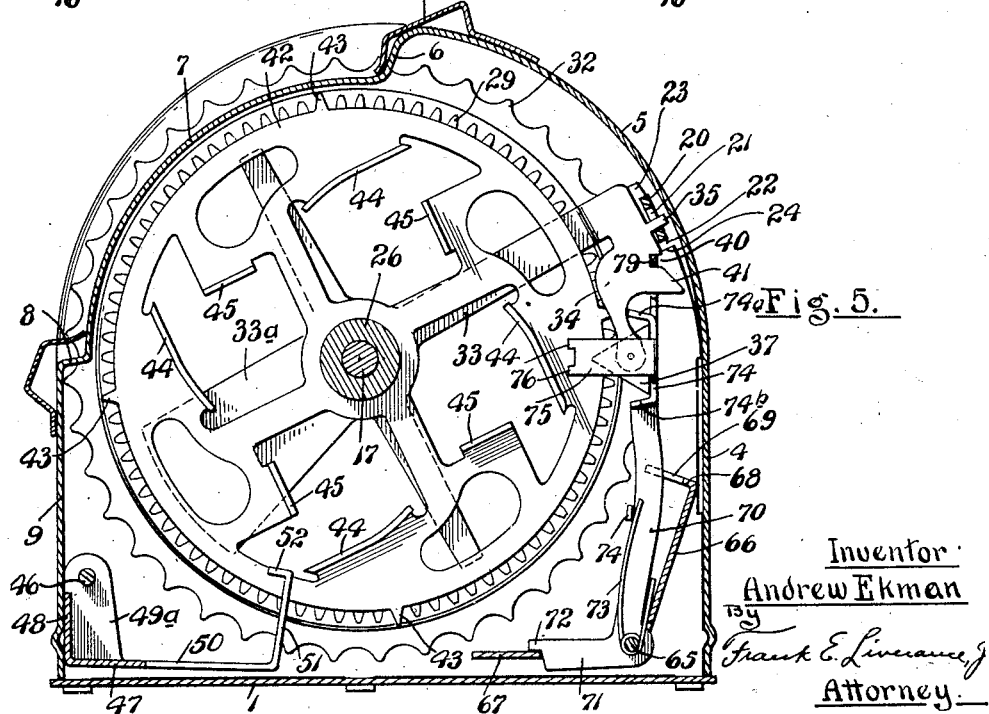
Fig. 5 is a transverse vertical section through said machine.
Figure 6:
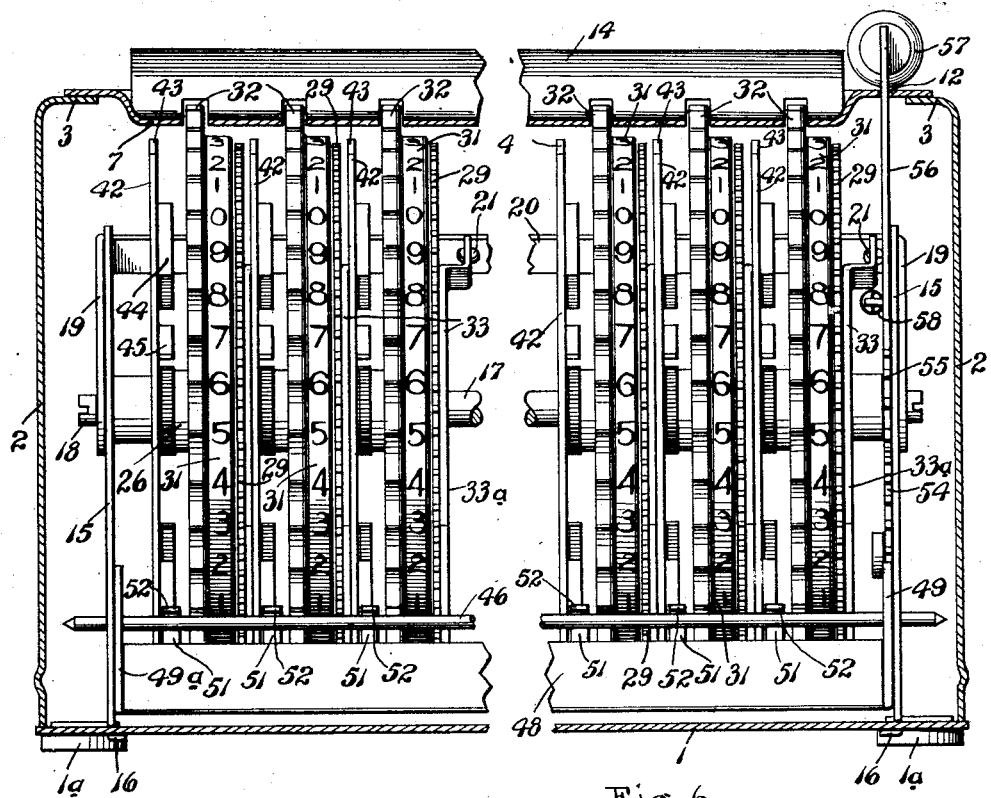
Fig. 6 is a front elevation of the interior mechanism, the casing or housing therefor being shown in vertical longitudinal section.

At the same end of the hub 26 where the wheel having spokes 27 and rim 28 is attached, a bar 33 is mounted loosely and extends outwardly beyond the gear teeth 29 of the computing unit with which it is associated, lying closely adjacent thereto. The bar is extended to the opposite side of the hub 26 on which it is loosely mounted and is widened, as indicated at 33ª, so as to substantially balance the same on the hub. The bar 33 at its rear end, beyond the gear teeth, is laterally offset and then formed with a depending arm 34 from which a tongue 35 extends rearwardly passing through an opening 21 in the cross bar 30 of the bail heretofore described. The width of the lug 35 is approximately one half of the diameter of the opening 21 through which it passes. At the lower end of the arm 34 a pin 36 is secured on which a triangular shaped member 37 of equilateral form and a pinion member permanently secured to the triangular member are mounted for rotation. The pinion member consists of two parts 38 and 39, the former of which is formed with six pinion teeth and is in mesh with the teeth 29 of the rim 28 of the computing unit with which bar 33 is associated, while the latter pinion part 39 has the same number of teeth but is cut down substantially to the pitch line of the pinion part 38, the depth of the teeth for the two pinion parts 38 and 39 being the same. It is evident that when a computing unit is turned on the shaft 17 the gear teeth 29 turn its associated pinion 37 whereupon the triangular member 36 is turned and also the pinion part 39. The combined triangle and pinion member is slipped over the projecting end of the pin 36 and is held thereon by reason of the stop interposed against the longitudinal movement on the pin by the adjacent section 30, as shown in Fig. 3. It will be noted that at the rear edge of each arm 34, as shown in Fig. 5, in addition to the tongue 35, a recess 40 is made below said tongue above a rearwardly extending projection 41 having a downwardly inclined upper edge, the purpose of which will later appear.

Each computing unit at the other end of the hub 26 carries a plate 42 from which, at angles of 90 degrees to each other, four teeth 43 project. This plate may be termed the carrying plate for carrying from one column to the next higher in the machine. The carrying plates 42 are located at the left hand ends of the hubs while the gear wheels and the bars 33 are at the right hand ends of said hubs in this machine. Accordingly, a hub at its left hand end carries a plate 42 which lies alongside of the bar 33 of the computing unit next to the left and the edges of the carrying plate 42 of one computing unit come directly under the pinion part 39 of the next unit to the left. Whenever a computing unit is operated it is apparent that the plate 42 is likewise moved with it carrying its teeth 43 to the pinion part 39, and when a tooth 43 engages therewith the pinion is turned transmitting its movement to the gear wheel having teeth 29 of the next higher succeeding unit thus carrying over to the next succeeding higher column. For a purpose which will hereafter be described the pitch diameter of the teeth 43 is slightly greater than the pitch diameter of the gear teeth 29 and the pitch diameter of the pinion part 39 is less than the pitch diameter of the pinion part 38.

Figure 14:
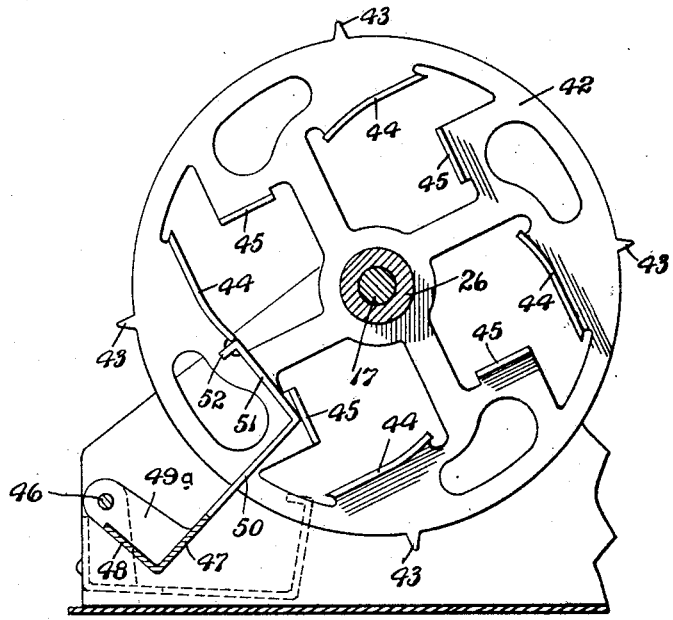
Fig. 14 is a vertical section through the machine showing one of the carrying discs and the means for the clearing mechanism in its operative position.
Figure 15:
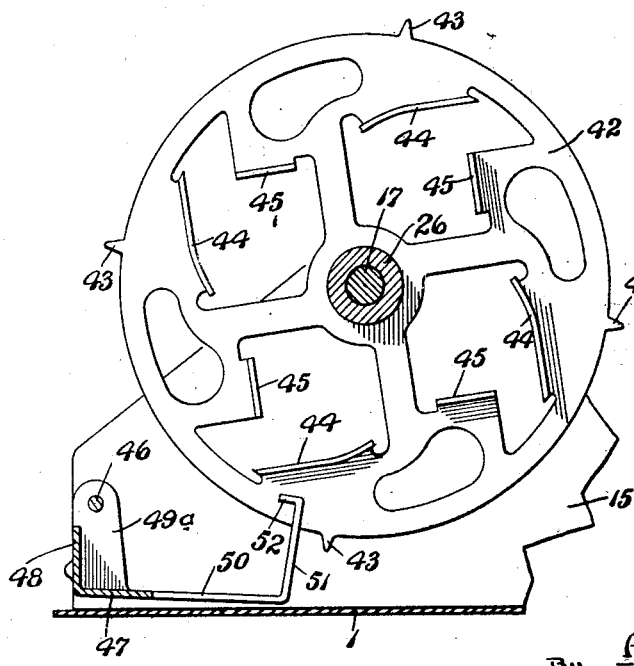
Fig. 15 is a like view, said means being shown in inoperative position.

Each carrying plate 42 is formed with laterally struck flanges 44 and 45, four series or pairs thereof being made on each plate. The flanges 44 are longer than flanges 45 and said flanges lie in relation to each other as shown in Figs. 14 and 15. At the front lower portion of the machine a horizontal rod 46 is mounted between and supported by the end plates 15. An angle bar having legs 47 and 48 at right angles to each other is mounted on the rod 46 by means of the ends 49 and 49ª turned therefrom and integral therewith. From the rear edge of the leg 47 a number of arms 50 extend to the rear for a distance, there being one of said arms for each plate or disc 42, and are then turned upwardly for a short distance, as shown in 51, terminating in forwardly turned lips 52. These rearwardly extending members lie in the same vertical planes with the flanges 44 and 45 on the carrying plates 42 with which they are associated. In the normal lower position of the arms 50, as shown in Fig. 15, no interference is made in any way with the free turning movement of the plates 42.

The member 49 which, with the member 49ª, carries the angle bar at the lower front portion of the machine is formed at one edge with a series of gear teeth 53 which are in mesh with a pinion 54 mounted on a stud carried by the adjacent supporting end 15. The pinion in turn engages with teeth 55 formed at the lower end of a lever 56 pivotally mounted on the shaft or rod 17 (see Fig. 7). The lever 56 extends upwardly through slot 12 in the casing and is equipped at its upper end with a button 57 against which the finger may press to operate the lever. Lever 56 is normally held in upper position by a coiled spring 58, which when the lever is operated in a downward direction is stretched and acts to return the same to upper position when released. On the downward movement of the lever 56 through the gearing described, the angle bar comprised of parts 47 and 48 is rotated upwardly about the rod 46 and all of the fingers 50 with attached sections 51 and 52 are lifted, as shown in Fig. 14.

Figure 7:
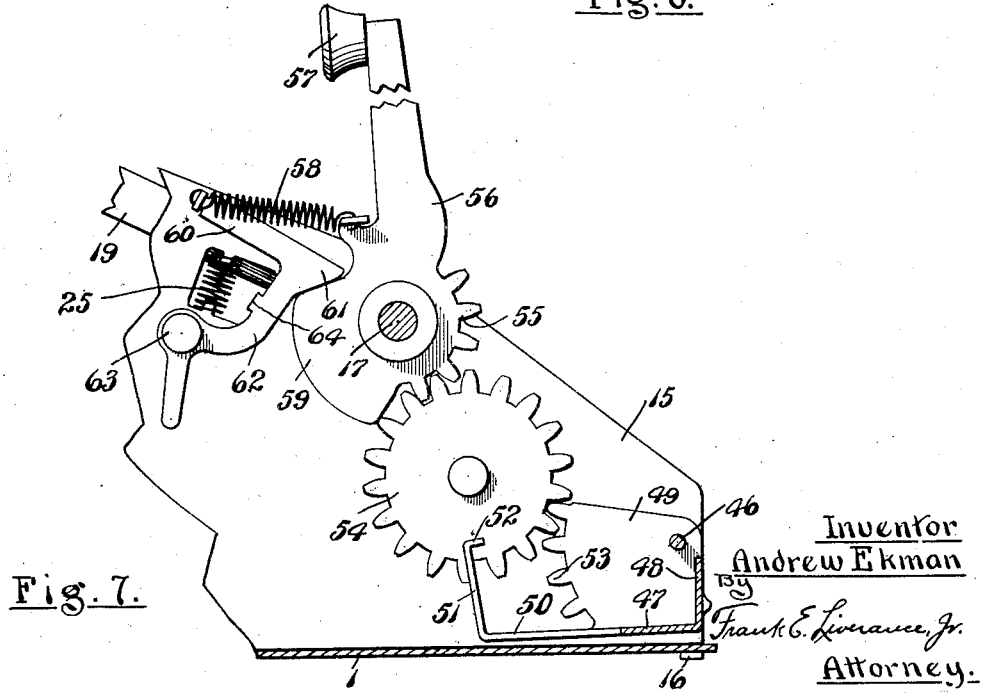
Fig. 7 is a fragmentary enlarged side elevation, with some parts in section, illustrating the clearing lever and associated mechanism.
Figure 8:
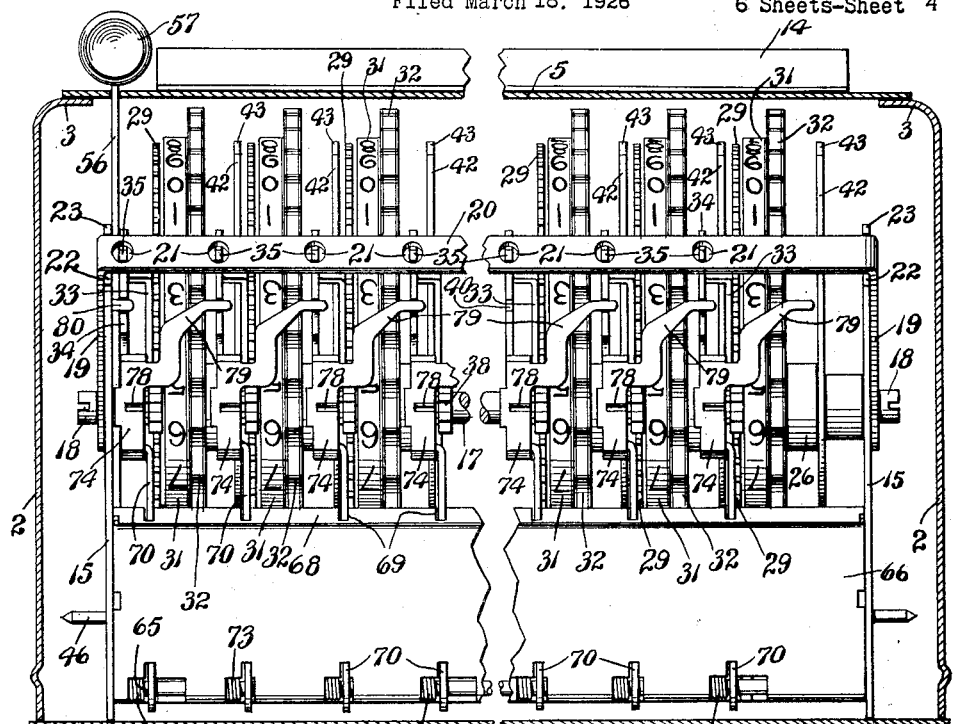
Fig. 8 is a rear elevation of the interior mechanism, the casing being shown in vertical longitudinal section.

The lever 56 at its lower end is equipped with a projecting cam 59, as shown in Fig. 7, and the spring 58 connected to the lever, at its opposite end is connected to an irregularly shaped member having an upper arm 60 at the front end of which a wedge shaped cam 61 is located, there being a second arm 62 extending downwardly from the upper arm 60 which is pivoted on the stud 63 carried by the adjacent end member 15. A lug 64 is turned inwardly from the arm 62 passing through an opening in the end 15 and lying underneath the adjacent leg 19 of the U-shaped bail heretofore described. The wedge member 61 bears against the upper side of the cam 59 but on the downward movement of lever 56 the irregularly shaped member described is turned upwardly and to the rear about the axis of the stud 63 bringing the lug 64 against the under edge of arm 19 whereby the bail is maintained in upper position the cross bar 20 engaging against lips 23.

Figure 11:
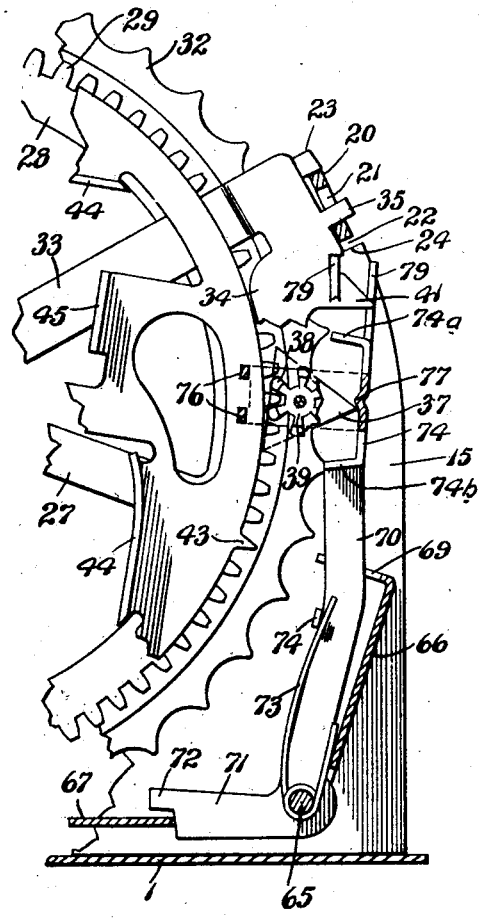
Fig. 11 is a fragmentary side elevation of the rear portion of one of the computing units illustrating the construction and the operation thereof at one stage of such operation.

A second horizontal rod 65 is disposed between and carried by the end plates 15 at the rear lower portion of the machine, best shown in Figs. 5 and 11. A sheet metal plate 66 is located in nearly vertical position inclined somewhat to the rear between the end plates 15 and has a horizontal forward extension 67 at its lower edge, the rod 65 being located at the bend between the parts 66 and 67. This plate is permanently rigidly secured in place between the end plates. The plate 66 at its upper edge is bent forward to make a ledge 68 in which a number of slots 69 are cut, one for each computing unit. The plate 66 and its lower horizontal extension 67 are also slotted a number of times at the bend between the two parts, there being a slot for each computing unit. In each of said slots a bell crank member is disposed and pivotally mounted on the rod 65. Each bell crank member includes a vertical arm 70 and a horizontal arm 71. Each of the horizontal arms 71 is formed with a narrow forwardly extending lip 72 at its front end which extends beyond the front end of the slot in which it is disposed so as to bear against the upper side of the extension plate 67, being normally pressed thereagainst by a spring 73 coiled around the rod 65 having one end bearing against the plate 66 and the other against a tongue 74 struck from its associated arm 70 of the bell crank lever. At the upper end of each arm 70 a metal member is permanently secured, comprising a vertical section 74 from the upper and lower edges of which flanges 74$^a$ and 74$^b$ extend forward, as shown in Figs. 5, 11, 12, and 13. The distance between the flanges 74$^a$ and 74$^b$ is but little more than the length of a side of the triangular member 37 and normally, a side of a triangular member bears against the front side of the vertical section 74, as shown in Fig. 5. In addition at a vertical edge of the section 74 an integral horizontal arm 75 extends forward to a short distance in front of the associated triangular shaped member 73 and at its front end is provided with upper and lower spaced apart lips 76 turned at right angles to the body of the arm 75, as shown. Each of the vertical sections 74, at a point substantially midway its upper and lower edges, is formed with a forwardly extending rib 77 (see Figs. 11, 12 and 13) and each edge of each of the triangular shaped members 37 is formed with a corresponding recess 78 large enough to receive the rib. From the upper end of each of said vertical sections 74 and at the edge opposite where the arm 75 is located an irregularly shaped arm 79 extends upwardly and laterally terminating in a finger which is received in the notch 40 made in the next adjacent arm 34 which depends from the bar 33, previously described. The end plate 15 at the right hand end of the machine is also equipped with an inwardly turned lug or finger 80 lying substantially in the same plane with the terminal fingers at the ends of arm 79.

The number of computing units which may be mounted on the rod 17 is not limited to any particular number but may be made as many as desired. In the machine shown eight of the computing units are used. The first unit at the right is for the units column, the second for the tens, the third for hundreds, etc. If an addition operation is to be performed involving, for example, the addition of 243 to what has before been added together, the operator places his fingers in the recesses of the operating members between the projections 32 at 2 on the hundreds computing unit, 4 on the tens computing unit and 3 on the units computing unit, turning all of the members in a downward direction until the fingers of the operator are stopped by engagement with the stop bar 13. This can be done and all of the computing units operated simultaneously if there is no carrying from one computing unit to the next higher, that is being operated. It is not necessary that all should be operated simultaneously or in any particular order but each may be individually operated, such individual operation being necessary if any carrying to the next unit occurs. Whenever a unit is operated the gear teeth 29 drive the pinion part 38 associated therewith and turns the connecting triangular shaped member 37, thereby forcing the connected arm 70 to the rear against the spring 73, as shown in Fig. 11. As the number of teeth in the gear 29 is eighty while the pinion has six teeth and the member 37 three equal sides, with each notch of the operating member moved downwardly the triangular member 37 changes from one of its sides against the part 74 with which it is associated to the next succeeding side. And when this happens the arm 79 is also moved to the rear and the finger at its free end disengaged from the recess 40 in arm 34 on the bar 33 associated with the next higher computing unit. If no carrying occurs the triangular shaped member 37 will merely turn around the axis of the pin 36 a number of times and will come to rest with a flat side of said member 37 against the vertical section 74 of the member with which it is associated. The rib 77 prevents any possibility of a corner of the triangular member 37 engaging against the section 74 in such a position that the triangular member will be on dead center. Inasmuch as any point of the member 37 must come either above or below the rib 77 no stopping of the triangular member 37 will act to turn said triangular member and parts associated therewith so that a flat edge of the member 37 will be against the vertical section 74 when the machine comes to rest. Moreover, the pressure of the bar 70 which carries the member at its upper end with which the triangular shaped member engages serves in a large measure to govern the speed and prevent any spinning of any computing unit which may be operated carelessly.

Figure 9:
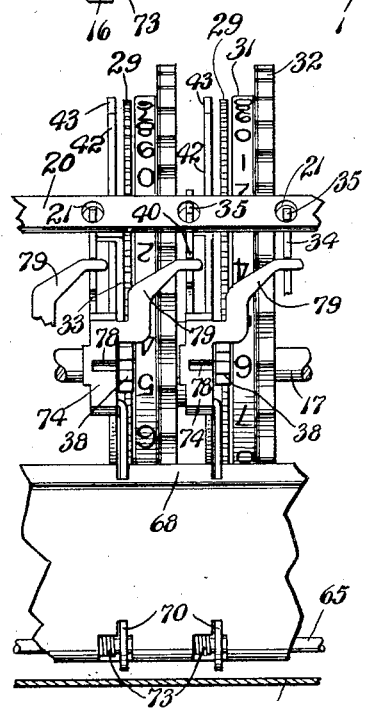
Figs. 9 and 10 are fragmentary rear elevations of contiguous units of the machine, the parts occupying different positions such as occurs during the operation of the machine for addition and subtraction.
Figure 10:
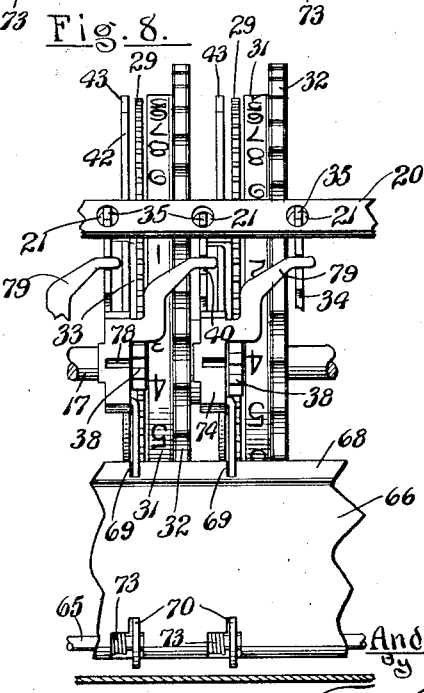
Figure 12:
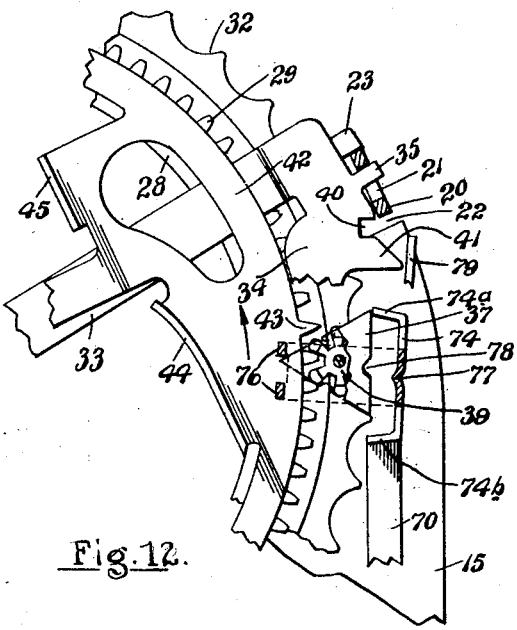
Fig. 12 is a similar view illustrating a different state of operation of the machine.

The mechanism described serves a still further and important function in the carrying from one computing unit to the next higher which is performed when a projection or tooth 43 on a disc 42 engages with the pinion part 39 associated with the next adjacent computing unit, this being shown in Fig. 12. The next higher unit which has been moved one step with the carrying has its bar 33 freed from any connection with the finger on arm 79 of the next lower unit from which the carrying occurs. As soon as this occurs the lug 35 on the bar 33 of said next higher unit moves from its lower position in the opening 21 of the bail bar 20 as shown in Fig. 11, to the uppermost position, as shown in Fig. 12, also in Fig. 9. When the tooth 43 engages with the pinion part 39 the first effect of such engagement, the tooth 43 moving in an upward direction, is to lift the bar so that lug 35 occupies its upper position shown in Fig. 12. Lifting the bar raises the pin 36 and parts carried thereby. Accordingly, when the triangular shaped member of the next higher unit, to which carrying is being made, turns by reason of the engagement of the tooth 43 of the next lower unit with the pinion part 39, it moves said triangular shaped member upwardly and to the position shown in Fig. 12. When thus moved the next higher unit has been turned one step only so as to carry from one integer indicated on the flange 31 to the next higher. Any tendency for the next higher computing unit to rotate farther is positively stopped by the engagement of one corner of the triangular shaped member between the two lips 76 while any possible rebound is stopped by the engagement of another corner of the member 37 with the free edge of the upper flange 74ª. Accordingly, there can be no overthrow in carrying from one unit to the next higher unit nor any rebound, but the carrying is positively and fully controlled and is accurate and sure under all conditions. In like manner should the carrying be from one unit to a next lower unit, that is, in a backward direction during a subtraction operation, the same process is carried through though in a reverse direction, being fully shown in Fig. 13, in which case any spinning in one direction or rebound in the opposite direction is stopped by reason of the fact that the triangular shaped member 37 controlling the unit which is to be operated from another unit during carrying, is held against rotative movement beyond one single step of movement. It is necessary, accordingly, that the computing units be released in order that the finger at the free end of the arm 79 may ride up and over the incline on the part 41 and into the recess 40 thereby drawing the bar 33 to its normal lower position before a succeeding operation may take place.

Figure 13:
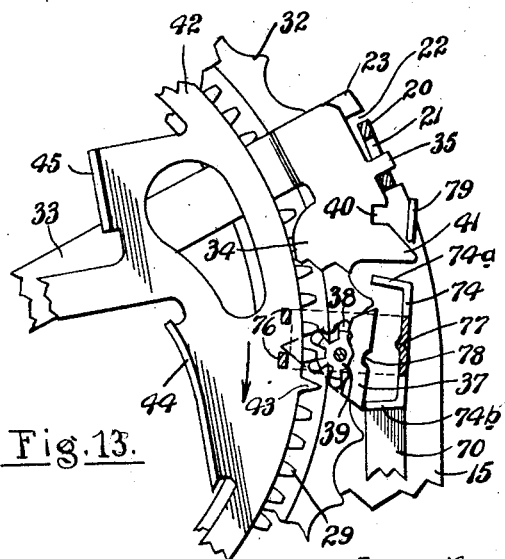
Fig. 13 is a similar view illustrating a still further stage in the operation of the machine showing a different position of the parts.

The mechanism, shown in Fig. 7, to insure that the cross bar 20 of the bail described shall be held in upper position during the clearing or zero setting of the machine, is necessary for the reason that during a clearing operation and a rotation of the units in a backward direction, if the bar 20 were permitted to take its lower position, as shown in Fig. 13, clearing for each unit would have to be by step by step operation because of the engagement of the various triangular members 37 with a lug 76 and the front edge of its associated flange 74ᵇ. But by holding the bar 20 to upper position, as shown in Fig. 12, while all of the lugs 35 drop to their lowermost positions in the openings 21, the triangular shaped members are permitted to rotate freely and are not stopped at the end of each step, as they otherwise would be. The clearing of the machine or return of the dials at 31 so that zeros are shown through the openings 11, is accomplished simply by the operator grasping the clearing lever 56 and drawing down thereon as previously described. This raises all of the fingers 50 and the attached parts 51 and 52. If a carrying member be in a position such as shown in Fig. 15, the elevation of a finger 50 associated therewith brings the part 52 up against the under side of the flange 44 immediately above and the member 42 is turned to the position shown in Fig. 14, stopping when the adjacent flange 45 strikes against the finger 50 substantially at the bend where the part 51 is turned therefrom. This is shown fully in Fig. 15 which also shows that the plate 42 cannot turn in the opposite direction as the part 52 strikes against the end of the flange 44. When stopped in such position it is designed that the zero character of the computing unit carried on the same hub 26 will appear through the opening 11 in the casing part 7. As all of the units are simultaneously acted upon the entire machine is cleared at the one operation.

The slight enlargement of the pitch diameter of the teeth 43 on the discs 42 over the pitch diameter of the gear teeth 29 together with the differences in pitch diameters of the two pinion parts 38 and 39, aids in obviating any bad effects which might occur from lost motion or back lash between the gearing and pinions. Absolute perfection of gear formation is almost impossible and even if it was present in machines when first made would soon be lost because of the wear occurring; and the construction as made, with the varying pitch diameters obviates any effects of such lost motion.

From the foregoing it is apparent that I have provided a very simply constructed adding machine in which addition and subtraction may be very quickly and easily accomplished. The subtraction operation is merely a reversal of the adding operation, the operating members being turned in the upward direction until the fingers of the operator strike the upper stop bar 14. Complementary smaller figures on the casing at the left of the slots 10 are the guides for the fingers. All of the parts of the machine are of sheet metal readily formed with dies with the exception of a very few stock or fabricated parts. A great many of the parts are duplicates and the machine can be made at very low cost. The casing at the front and back is formed with beads 9ª and 4ª designed to spring over projections at the front and rear edges of the plates 15 for securely holding the casing on the plates and over the mechanism. Economy in manufacturing cost combined with extreme simplicity in operation make the invention one of value. The invention is defined in the appended claims and I consider it to comprehend all forms of structure coming within the scope of said claims.

I claim:

1. In an adding machine, a computing unit mounted to turn on a horizontal axis, said unit including a gear, a member loosely mounted alongside of the computing unit, a combined pinion and triangular shaped member mounted on said first member, the pinion meshing with the gear, a bar pivotally mounted at one end, a plate attached to the free end of the bar against which the triangular shaped member bears, and spring means acting on the bar to move the plate connected with it into spring pressed engagement with said triangular shaped member.

2. In an adding machine, a computing unit mounted to turn about a horizontal axis, said unit including a gear, a bar loosely mounted alongside of the gear and extending to the rear of said gear, said bar having a depending free end, a combined pinion and triangular shaped member mounted for rotation on said depending free end of the bar, the pinion meshing with said gear, a second member having a vertical web and upper and lower flanges extending toward the triangular shaped member against which one edge of said triangular shaped member normally bears, spring means normally holding the second bar in a forward position, and means engaging with the first bar to limit the extent of its movement.

3. In combination, a horizontal rod, a plurality of computing units rotatably mounted thereon, each comprising a hub loosely mounted on said rod, a gear wheel and an operating member attached to the gear wheel to manually turn the same, a member mounted on the hub alongside of each gear wheel and extending upwardly and to the rear, a triangular shaped member rotatably mounted at the rear end of said first mentioned member, a pinion secured to and rotatable with the triangular shaped member, said pinion including two pinion parts of different pitch diameters, one of said pinion parts engaging with the gear wheel of its associated unit, and a carrying wheel connected to each hub having spaced apart teeth projecting therefrom and meshing with the smaller of said parts of the pinion of the unit next adjacent, substantially as described.

4. In an adding machine, a plurality of rotatably mounted computing units mounted for individual rotation about a common horizontal support, means whereby said units may be turned about said support in either direction, means for carrying from one unit to the next adjacent higher unit on either direction of movement of the lower unit, and means for preventing movement of said higher unit in either direction beyond a predetermined distance, substantially as described.

5. In an adding machine, a computing unit comprising a hub, a sheet metal gear wheel attached thereto, a sheet metal member attached to the gear wheel and provided with an annular dial flange on which consecutive figures are carried and with outwardly extending spaced apart finger engaging projections, a second member loosely mounted on the hub alongside of the gear wheel and formed at its outer end with an offset downwardly extending arm, a pin attached to the arm, a third member having a plurality of equal sides rotatably mounted on the pin, a pinion connected to and rotatable with said third member and in mesh with the gear wheel, a spring actuated fourth member yieldingly bearing against a side of said equally sided member.

6. In an adding machine, a computing unit including a manually operable operating member and a gear connected therewith and a dial carrying figures in succession therearound, means for mounting the unit for rotative movement, a pinion in mesh with the gear, a support for the pinion, a member having a plurality of equal sides connected to and rotatable with the pinion, a pivotally mounted arm, a flat member at one end thereof adapted to bear against a side of the equal sided member and a spring associated with the arm for holding said flat member against the equal sided member.

7. In an adding machine, a computing unit including a manually operable operating member, a gear and a totals dial connected and associated therewith, means for mounting the unit for rotative movement, a pinion in mesh with the gear plate, a support for the pinion, a member having a plurality of equal sides connected to and rotatable with the pinion, said equal sided member in each of its sides being formed with a recess, a pivotally mounted arm, a flat member at one end thereof adapted to bear against a side of the first equal sided member and formed with inwardly extending rib adapted to seat in a recess in the side of said equal sided member and spring means acting on the arm for holding said flat member against the equal sided member, substantially as described.

8. In an adding machine, mechanism including a plurality of computing units located side by side on a common rod support and mounted for individual rotation thereon, each unit including an operating member adapted to be manually operated, a gear and a dial having figures thereon, a pinion in mesh with the gear and operated thereby, a support for the pinion, a member having a plurality of equal sides connected to and rotatable with the pinion, and a second member having a flat portion yieldingly pressed against the first member, substantially as described.

9. In an adding machine a rotatably mounted computing unit comprising a sheet metal plate formed with an annular flange on which figures are carried and with outwardly projecting spaced apart finger engaging portions, a gear wheel to which the sheet metal plate is connected, a hub to which the gear wheel is secured, a member loosely mounted on the hub alongside the gear wheel, said member being formed at one side with a downwardly extending arm, a pin attached to the arm, a second member having a plurality of equal sides rotatably mounted on the pin, a pinion connected to and rotatable with said second member and in mesh with the gear wheel, and a spring actuated plate yieldingly bearing against a side of said equal sided member, substantially as described.

10. In an adding machine, a plurality of computing units mounted to turn about a horizontal axis, each of said computing units also including means adapted at prescribed points in its movement to engage with the device of the next higher computing unit and turning the same one step thereby turning said next higher unit, and means brought into operation when said next higher adjacent unit is turned one step of movement whereby the turning movement of said next adjacent higher movement is limited to one step of movement, substantially as described.

11. In an adding machine, a plurality of computing units rotatively mounted to turn about a horizontal axis each being individually operable, each unit including a central hub, a gear, a totalizing dial carrying figures and a means for manually operating the unit, a bar loosely mounted on the hub of each unit and extending upwardly and to the rear back of the gear and provided with a down turned part, said bar lying alongside of said gear, a device rotatatively mounted at the lower end of said downturned part including a member having a plurality of equal sides and a pinion having two sections one of larger diameter than the other, the gear of a unit being in mesh with the larger pinion, a plate secured at the opposite end of each unit having teeth projecting therefrom at spaced apart intervals, said teeth being adapted to engage with the smaller pinion part of the device associated with the next higher computing unit, a plurality of other bars pivotally mounted at their lower ends below said devices and extending upwardly toward the same, springs normally impelling the said other bars toward the equal sided members, an irregularly shaped member secured at the upper end of each of said last named bars having a central vertical section, and sections turned forwardly from the upper and lower ends of the central section and also having an arm extending forwardly from one side edge to in front of its associated equal sided member, the front of said arm having two spaced apart lips turned laterally in front of the equal sided member, and a second arm extending upwardly and laterally from the opposite edge of the central vertical section across to the next higher computing unit, a bail mounted to turn about the axis on which the computing units are mounted, said bail including an intermediate portion having a plurality of openings therethrough, said bars lying alongside of the gears of the computing units being provided at their rear upper ends with lugs narrower in width than the openings in the bail which extend through said openings in the bail, each of said depending parts at the rear ends of the first bars being formed at their rear edges with a recess into which the terminal ends of said laterally extending arms may seat and with a rearwardly extending portion having an upwardly and forwardly inclined upper edge, substantially as described.

In testimony whereof I affix my signature.

ANDREW EKMAN.